US009130419B2

(12) United States Patent  
Lay

(10) Patent No.: US 9,130,419 B2  
(45) Date of Patent: Sep. 8, 2015

(54) SECURING STRUCTURE FOR MOTOR MAGNETS

(71) Applicant: Gwo-Rong Lay, Taichung (TW)

(72) Inventor: Gwo-Rong Lay, Taichung (TW)

( * ) Notice: Subject to any disclaimer, the term of this patent is extended or adjusted under 35 U.S.C. 154(b) by 21 days.

(21) Appl. No.: 13/974,079

(22) Filed: Aug. 23, 2013

(65) Prior Publication Data

US 2015/0054371 A1 Feb. 26, 2015

(51) Int. Cl.
*H02K 1/18* (2006.01)
*H02K 1/17* (2006.01)
*H02K 23/04* (2006.01)

(52) U.S. Cl.
CPC .. *H02K 1/18* (2013.01); *H02K 1/17* (2013.01); *H02K 23/04* (2013.01)

(58) Field of Classification Search
CPC ............ H02K 1/17; H02K 23/04; H02K 1/18
USPC .............. 310/154.01, 154.03, 154.08, 154.12
See application file for complete search history.

(56) References Cited

U.S. PATENT DOCUMENTS

| | | | |
|---|---|---|---|
| 4,851,729 A * | 7/1989 | Baines | 310/239 |
| 6,075,301 A * | 6/2000 | Shinoda | 310/154.17 |
| 6,880,230 B2 * | 4/2005 | Kawakami et al. | 29/596 |
| 7,091,642 B2 * | 8/2006 | Agnes et al. | 310/154.12 |
| 2007/0222310 A1* | 9/2007 | Drexlmaier | 310/51 |
| 2011/0037334 A1* | 2/2011 | Lay | 310/154.08 |
| 2011/0084564 A1* | 4/2011 | Huang | 310/154.12 |

\* cited by examiner

*Primary Examiner* — Michael Zarroli

(57) ABSTRACT

A securing structure for motor magnets includes a casing, a rotor, two magnets, a rear cover and a ring sleeve. The casing has two magnet seats bilaterally disposed on the outer wall, wherein the two magnets are fittingly combined in the two magnet seats and thus providing electrical force to the rotor, while the rotor disposed inside the casing. The rear cover and a brush fixing seat coaxially sleeve on one end of the casing. The ring sleeve mounts around the casing to offer an external restraining force to the magnets.

7 Claims, 7 Drawing Sheets

SECURING STRUCTURE FOR MOTOR MAGNETS

BACKGROUND OF THE INVENTION

1. Field of the Invention:

The present invention relates to a motor magnetic structure, and more particularly to a securing structure for motor magnets.

2. Description of the Related Art:

The electrical current passing the rotor wire of conventional Motors is provided by an external power, whereby the magnetic field of the wire is generated and interacts with the magnetic field of the stator, in order to enable the rotor to rotate. A motor mainly contains a casing, a rotor, and a plurality of magnets (stators). Two positioning members pre-installed in the casing are respectively applied to secure one end of each magnet, thereby securing a total of two magnets in two opposite positions on the interior wall of the casing, while at least one separating member is disposed between the other ends of the two magnets, in order to make the two magnets completely fixed on the casing. Afterward, the rotor is installed therein. Because the magnet is disposed on the interior wall of the casing, it is named as an "interior magnet". Installing a rotor into a motor with interior magnets may face greater difficulty. As a result of the relative magnetic effect between the rotor and magnets, the rotor is easy to deviate from the central axle and thus be stuck on the casing during the installation into the casing. Therefore repetitive failures must he experienced by users before accurately aligning the rotor with the central axle and successfully installing the rotor. This structure fails to meet current demands of installation, and thus desirable to be improved.

SUMMARY OF THE INVENTION

For solving such issues of rotor installation, the present invention offers a securing structure for motor magnets, which is a motor installed with exterior magnets.

The present invention relates to a securing structure for motor magnets, comprising a casing, wherein the outer wall has two magnet seats disposed on two opposite lateral sides, respectively; a rotor, disposed in the casing; two magnets, fittingly received in the two magnet seats and providing magnetic force to the rotor; a brush fixing seat, disposed on the casing; a rear cover, sleeving together with the brush fixing seat on one end of the casing coaxially; and a ring sleeve, mounting around the casing and offering an external restraining force to the magnets. The present invention is a motor structure for installing exterior magnets, wherein the installing difficulty of the motor with interior magnets is resolved.

BRIEF DESCRIPTION OF THE DRAWINGS

The invention as well as a preferred mode of use, further objectives and advantages thereof will be best understood by reference to the following detailed description of an illustrative embodiment when read in conjunction with accompanying drawing, wherein.

DETAILED DESCRIPTION OF THE INVENTION

Figure 1:
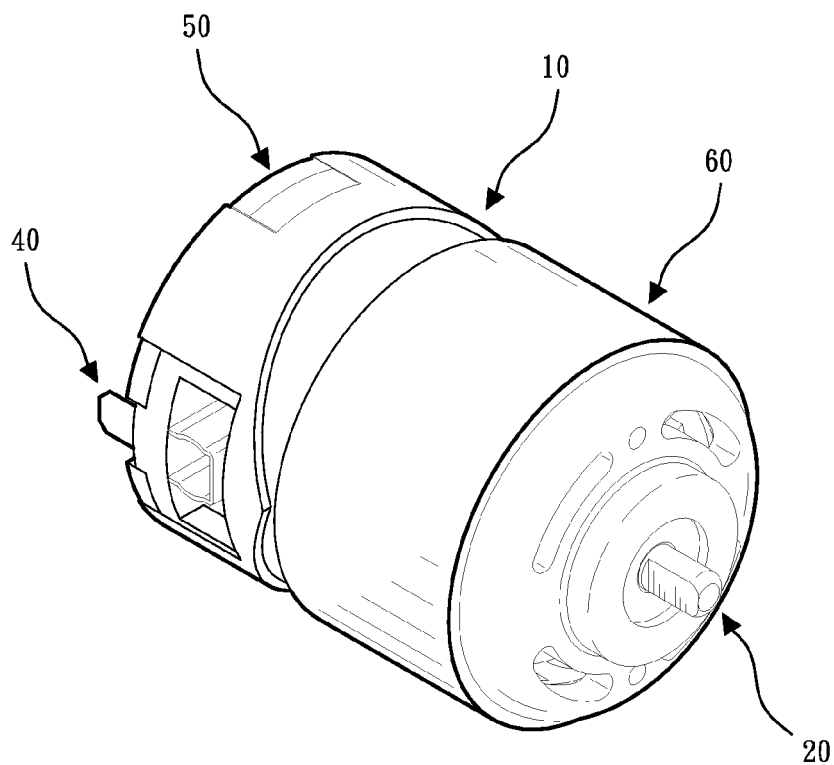
FIG. 1 is a perspective view of a first embodiment of the present invention.
Figure 2:
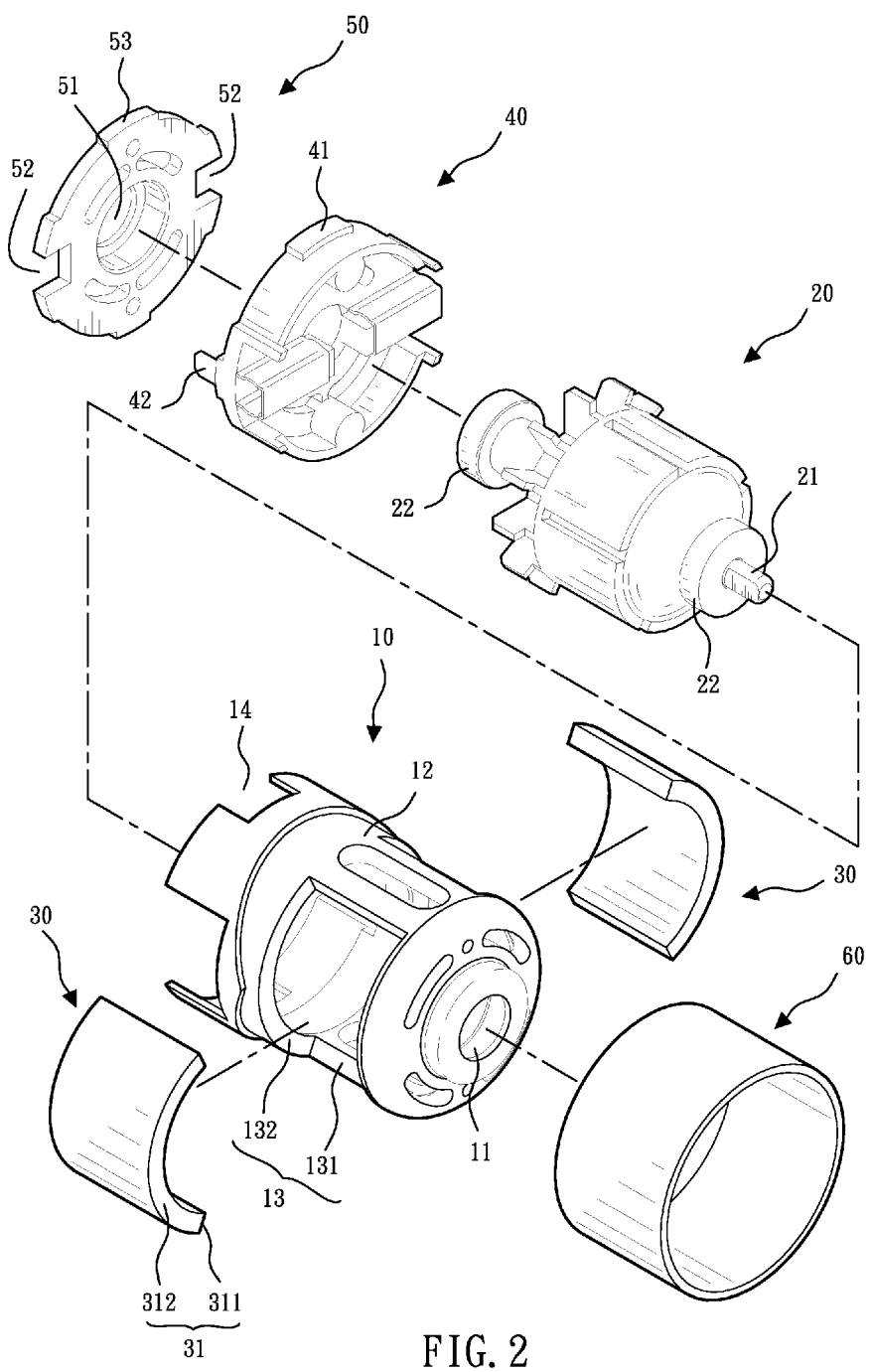
FIG. 2 is an exploded view of a first embodiment of the present invention.
Figure 3:
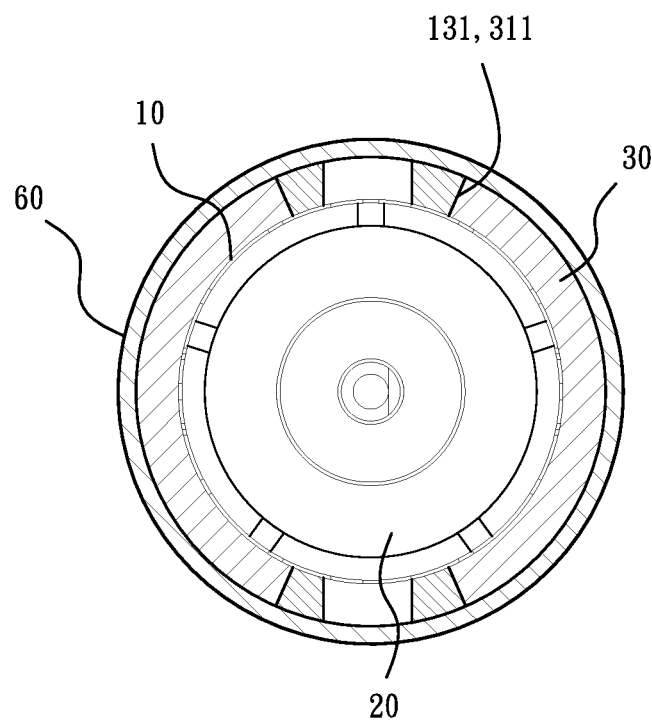
FIG. 3 is a schematic sectional view of a first embodiment of the present invention.

Referring to FIG. 1 to FIG. 3, a securing structure for motor magnets of the present invention comprises a casing 10, a rotor 20, two magnets 30, a brush fixing seat 40, a rear cover 50, and a ring sleeve 60.

The casing 10 has an axle bore 11 on one end, and forms a barrel-shaped outer wall 12 around the central line defined by the axle bore 11. Two magnet seats 13, in the form of hollowed cavities, are disposed oppositely and bilaterally on the outer wall 12. The magnet seat 13 consists of two oppositely disposed inner bevels 131 and two oppositely disposed inner lateral sides 132, while the two inner lateral sides 132 are connected with the two inner bevels 131, forming an opening. Further, the other end of the casing 10, opposed to the end with the axle bore 11, is provided with a plurality of concaves 14. The casing 10 is made of metal or plastic.

The rotor 20 is rotationally installed inside the casing 10, processing a shaft 21 with two bearings 22 disposed on each end, respectively.

The magnet 30 is a circular arc plate smaller than a semi-circle, possessing a peripheral edge 31. The peripheral edge 31 consists of two oppositely disposed outer bevels 311 and two oppositely disposed outer lateral sides 312, while the two outer lateral sides 312 are connected with the two outer bevels 311, forming a magnet plate. When the outer bevels 311 contact the inner bevels 131, and the outer lateral sides 312 contact the inner later sides 132, the border of the magnet 30 is bonded with the border of the magnet seat 13, whereby the magnet 30 is fittingly combined into the magnet seat 13, and thus providing magnetic force to the rotor 20.

The brush fixing seat 40 is disposed on the other end of the casing 10, opposed to the end with the axle bore 11. The circular edge of the brush fixing seat 40 is provided with a plurality of convexes 41, and at least two feet 42 protrude symmetrically from a flank of the brush fixing seat 40.

Figure 1A:
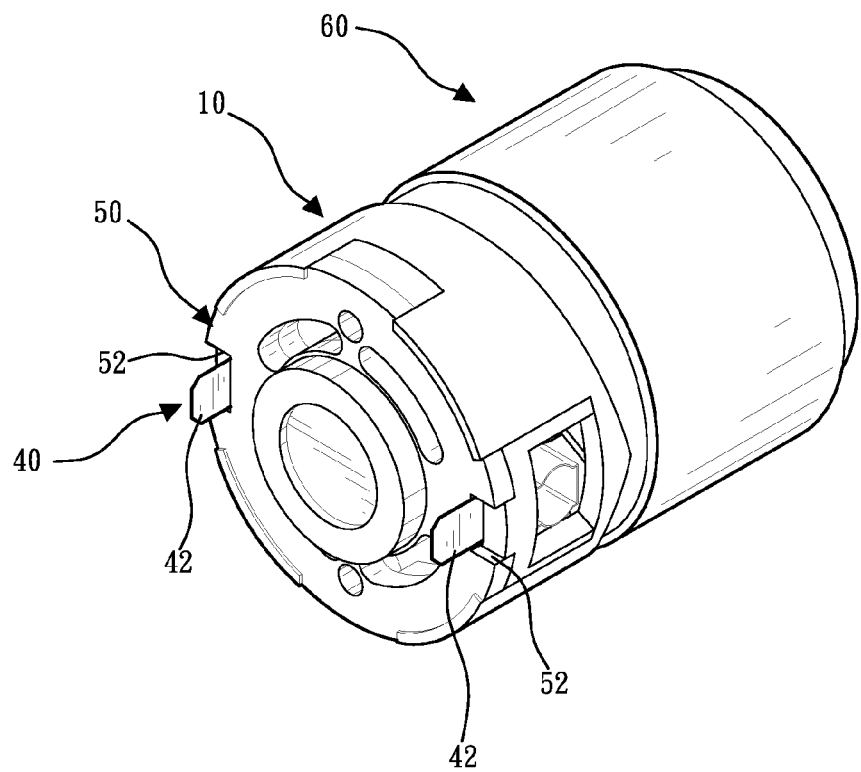
FIG. 1A is another perspective view of the first embodiment of the present invention taken from another view point.

The rear cover 50 has a through hole 51 in the center, which is in-line with the central line defined by the axle bore 11. Also, the rear cover 50 has at least two notches 52 disposed symmetrically for the feet 42 to pass through and fix, as shown in FIG. 1A. Further, the circular edge of the rear cover 50 is provided with a plurality of convexes 53. The brush fixing seat 40 and the rear cover 50 are mounted coaxially on the casing 10 by coupling the convexes 41 and the convexes 53 together with the concaves 14, wherein two ends of the shaft 21 of the rotor 20 are received in the axle bore 11 and the through hole 51, respectively. Simultaneously, the rotor 20 is thus remained in the central position of the casing 10, whereby the motor is allowed to be functioning steadily.

The ring sleeve 60 is a barrel-shape structure, which sleeves on the casing 10 to prevent the two magnets 30 from escaping from the magnet seat 13 during the operation of the motor.

Because the two magnets 30 are disposed on the outer periphery of the casing 10, the magnets are named as "exterior magnets". The challenge that users may face when installing rotors on motors with interior magnets is completely avoided during the installation of motors with exterior magnets. The installation of the present invention comprises the following steps: (a) disposing the rotor 20 inside the casing 10, and (b)

positioning the two magnets 30 in the magnet seat 13 on the casing 10. The rotor 20 is installed firstly in the absence of the magnetism influence from the two magnets 30, so the rotor 20 is not going to be stuck on the casing 10.

Figure 4:
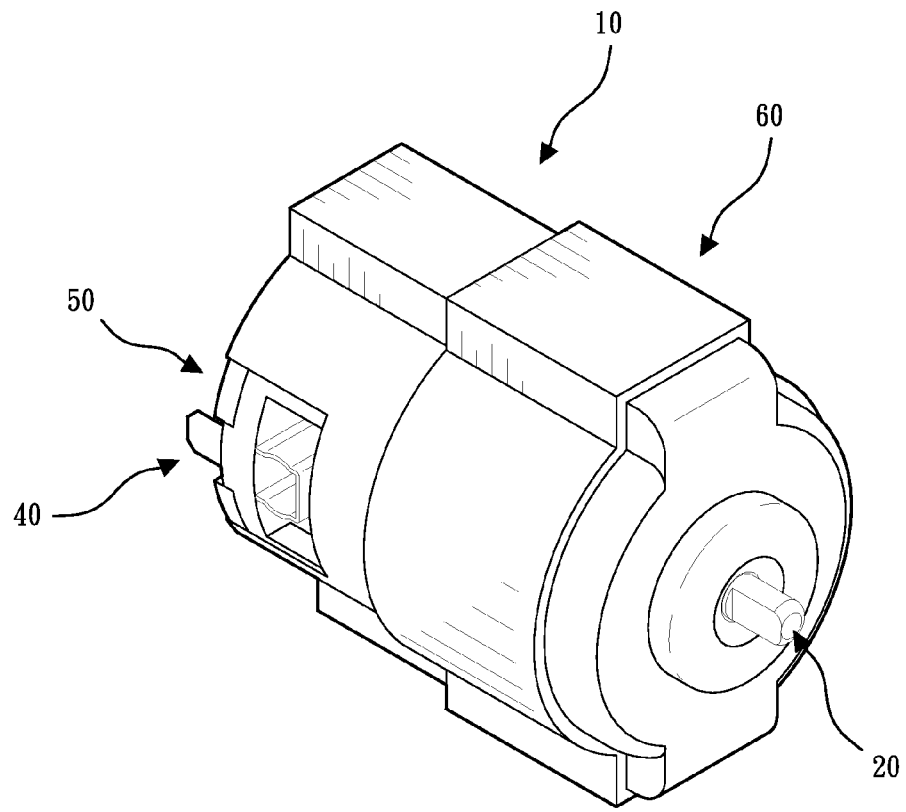
FIG. 4 is a perspective view of a second embodiment of the present invention.
Figure 4A:
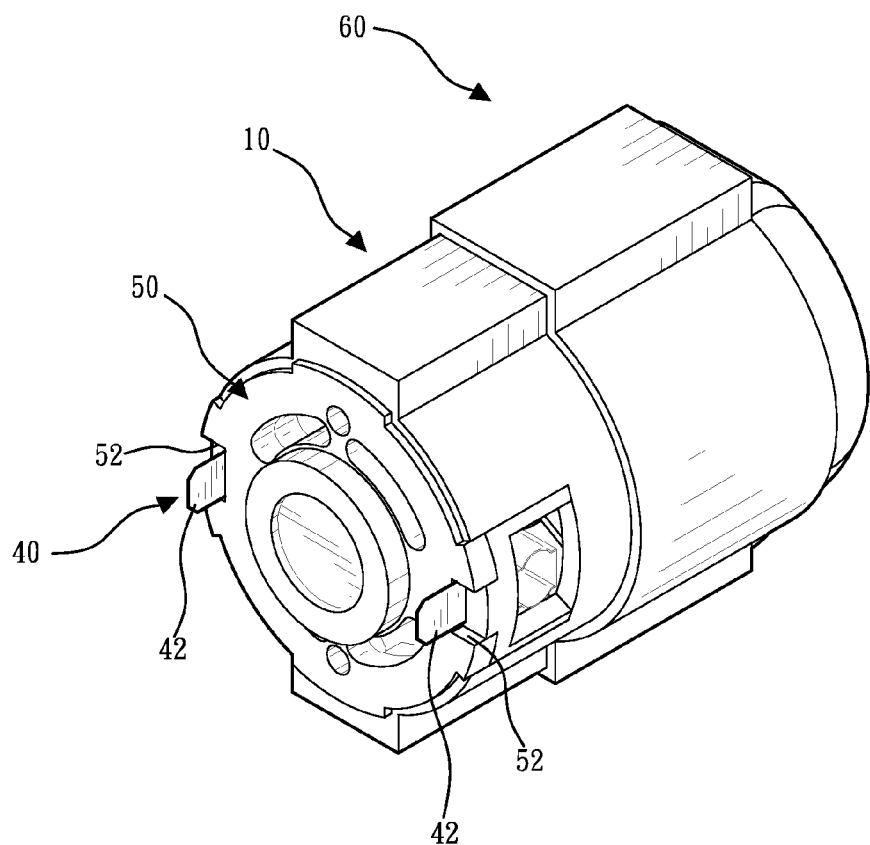
FIG. 4A is another perspective view of the second embodiment of the present invention taken from another view point.
Figure 5:
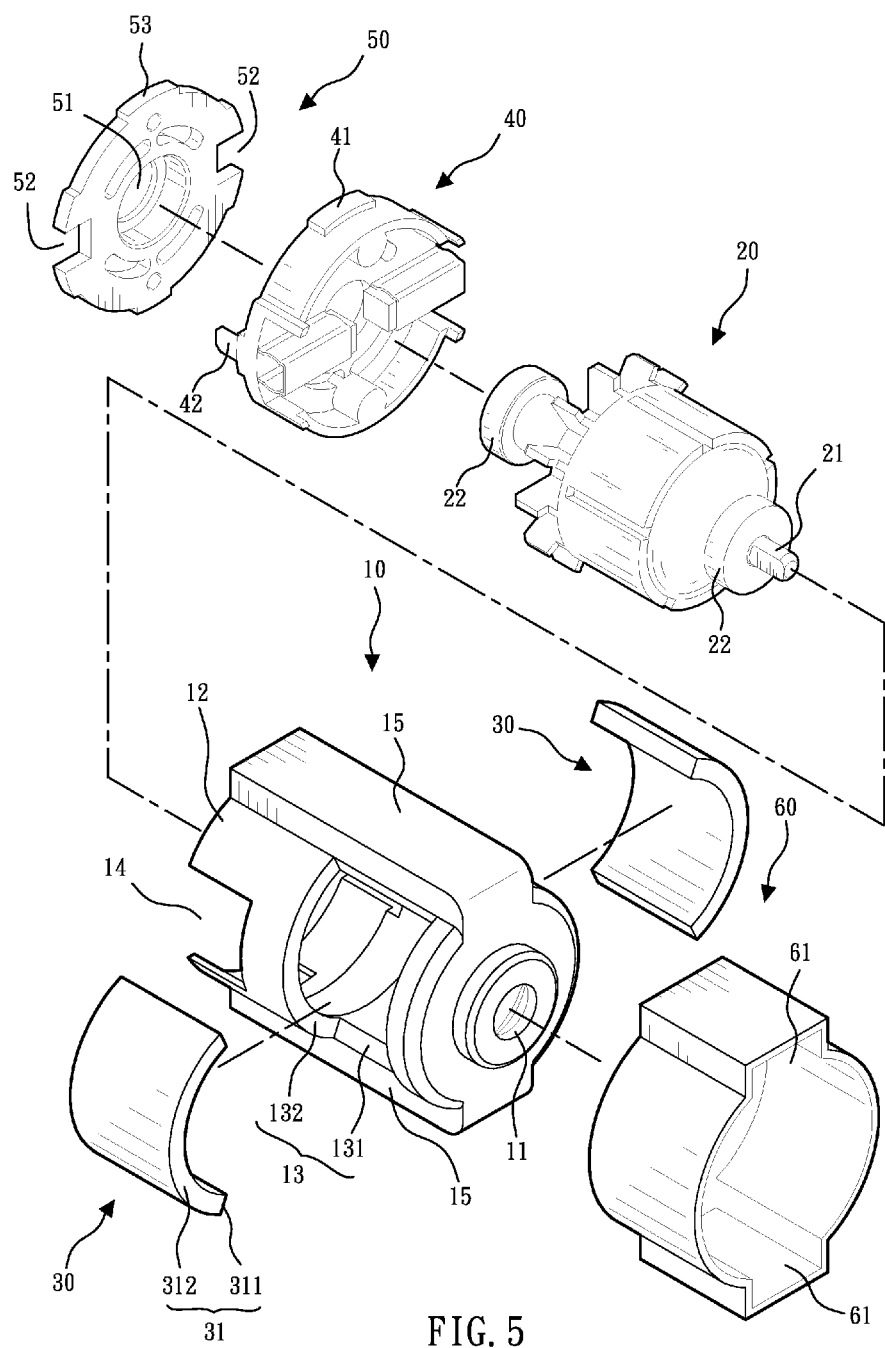
FIG. 5 is an exploded view of a second embodiment of the present invention.

FIG. 4, FIG. 4A, and FIG. 5 show a second embodiment of the present invention. Compared with the first embodiment, the difference of the second embodiment is that the ring sleeve 60 is sleeved on the casing 10 by coupling bumps and recesses structures, in order to fix the two magnets 30 on the casing 10. The ring sleeve 60 has two symmetric fixing recesses 61, and the casing 10 has two symmetric protrusions 15 for coupling with the fixing recesses 61, wherein the protrusions 15 are both disposed between the two magnet seats 13 and parallel to the central line of the axle bore 11, wherein the inner bevels 131 are connected with a lateral side of each of the protrusions 15 neighborly disposed. This embodiment illustrates that the shape of the ring sleeve 60 is allowed to be change in accordance to user demand.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A securing structure for motor magnets, which comprises:
    a casing, possessing an axle bore on one end, forming a barrel-shape outer wall around a central line defined by the axle bore, wherein two magnet seats, in a form of openings defined by two oppositely disposed inner bevels connecting with two oppositely disposed inner lateral sides, are provided bilaterally on the outer wall; wherein the casing has two symmetric protrusions disposed between the two magnet seats and parallel to the central line defined by the axle bore;
    a rotor, rotationally disposed inside the casing;
    two magnets, possessing respectively a peripheral edge defined by two oppositely disposed outer bevels connecting with two oppositely disposed outer lateral sides, wherein the outer bevels contact the inner bevels and the outer lateral sides contact the inner lateral sides, in order to make the magnet fittingly combined into the magnet seat, thereby providing magnetic force to the rotor; wherein the inner bevels are connected with as lateral side of each of the protrusions neighborly disposed;
    a brush fixing seat, disposed on the end opposed to the end with the axle bore;
    a rear cover, mounting together with the brush fixing seat coaxially on the end opposed to the end with the axle bore; and
    ring sleeve, mounting around the casing, while the ring sleeve is present as a barrel-shape and provided with two symmetrically disposed fixing recesses for coupling the protrusions, thereby prevent the two magnets from escaping from the magnet seat.

2. The securing structure of claim 1, wherein the magnet is a circular arc plate less than a semi-circle.

3. The securing structure of claim 1, wherein the end of the casing, in which mounted by the brush fixing seat, is provided with a plurality of concaves, while the brush fixing seat and the rear cover are both provided with a plurality of convexes for coupling with the concaves on the casing.

4. The securing structure of claim 1, wherein two symmetric feet protrude from one flank of the brush fixing seat, and the rear cover has two symmetric notches for the two feet to pass through and fix.

5. The securing structure of claim 1, wherein a through hole is disposed on a central position of the rear cover and in line with the central line defined by the axle bore.

6. The securing structure of claim 5, wherein the rotor has a shaft, with two ends thereof received in the axle bore and the through hole, respectively.

7. The securing structure of claim 6, wherein two bearings are disposed on the two ends of the shaft, respectively.

* * * * *